United States Patent [19]

Arai

[11] Patent Number: 4,843,700

[45] Date of Patent: Jul. 4, 1989

[54] LOCKING STRUCTURE OF WIRE ROD FOR FILTER ELEMENT

[75] Inventor: Koichi Arai, Kanagawa, Japan

[73] Assignee: Arai Corporation, Kanagawa, Japan

[21] Appl. No.: 70,032

[22] Filed: Jul. 6, 1987

[30] Foreign Application Priority Data

Jul. 4, 1986 [JP] Japan .................... 61-102098

[51] Int. Cl.$^4$ ............................................. B23P 19/00
[52] U.S. Cl. ........................ 29/163.7; 29/163.8; 29/456; 29/525.1; 55/351; 55/400; 55/498; 209/288; 210/359; 210/380.1
[58] Field of Search ............ 29/163.7, 456, 452, 29/526.1; 55/351, 400, 498; 209/288; 210/232, 359, 380.1, 498, 499, 497.1; 403/374, 409.1; 411/166, 169, 354, 438

[56] References Cited

U.S. PATENT DOCUMENTS

| | | | |
|---|---|---|---|
| 2,837,005 | 6/1958 | Gaul | 411/17 |
| 3,302,509 | 2/1967 | Modrey | 411/18 |
| 4,017,401 | 4/1977 | Holz | 55/400 X |
| 4,309,135 | 1/1982 | Gutshall | 411/17 |
| 4,494,603 | 1/1985 | Harguindey | 29/163.5 CW X |
| 4,569,763 | 2/1986 | Arai | 29/526 R X |
| 4,655,922 | 4/1987 | Arai | 29/526 R X |

FOREIGN PATENT DOCUMENTS 3813147  8/1983  Japan .
60-41515  3/1985  Japan .

Primary Examiner—Timothy V. Eley
Assistant Examiner—Frances Chin
Attorney, Agent, or Firm—Gifford, Groh, Sheridan, Sprinkle and Dolgorukov

[57] ABSTRACT

A locking structure of wire rod for filter element, which comprises perforating a locking hole larger than a sectional area of the wire rod near both ends or either one end portion of a cylinder with a passage leading in and out provided thereon, inserting an end portion of the wire rod in the locking hole, fixing mechanically the end portion of the wire rod by pushing forcedly in on a wedge. It is further intended that the wire rod is particularly formed triangularly in section, a threaded groove angled same as the top is formed to a desired slit on an outer peripheral surface of the cylinder, the surface on which the wire rod is wound is made even peripherally, thereby functioning effectively as surface filtration and surface separation.

2 Claims, 1 Drawing Sheet

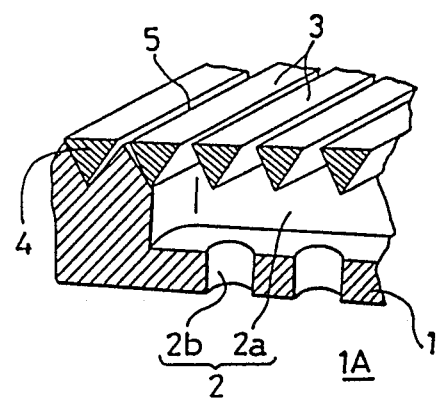
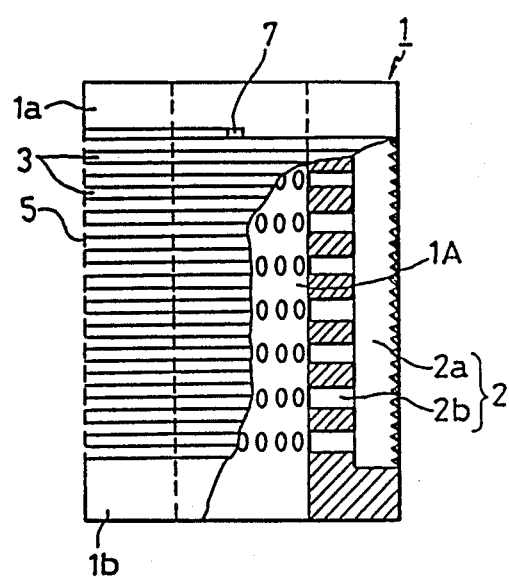
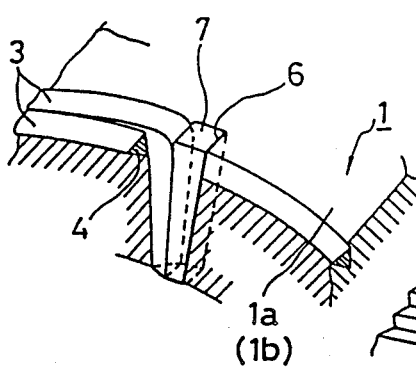
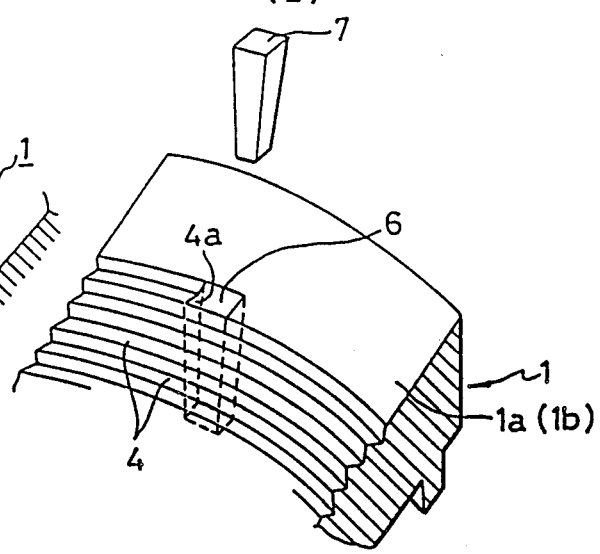

LOCKING STRUCTURE OF WIRE ROD FOR FILTER ELEMENT

BACKGROUND OF THE INVENTION

1. Field of the Invention

The present invention relates to a locking structure of wire rod for filter element with a preferred shape in section such as circle, triangle or the like, which can be utilized extensively for separation and filtration of liquid, solid and others.

2. Description of the Prior Art

In many cases a wire rod for the filter element of this kind is fixed on the outer peripheral surface of a cylinder a with a passage leading in and out provided thereon, by a welding means as disclosed in Japanese Patent Publication No. 13147/1963.

In other instances, a mechanical means of securing the rod is employed such as that disclosed by the applicant in Japanese Patent Laid-Open Application No. 41515/1985 and corresponding U.S. Pat. Nos. 4,569,763 dated Feb. 11, 1986 and 4,655,922 dated Apr. 17, 1987.

In the case of the former welding means, since a weld zone is formed on a part of the outer peripheral surface of the cylinder, axially thereof, an end portion of the wire rod to be wound thereon need not particularly be fixed tightly. However, the latter mechanical installing means must have the end portions particularly both the ends a of the wire rod mechanically fixed for contact fixation of the wire rod and the cylinder. In other words, the wire rod to be wound thereon can be fixed stably and securely by fixing the end portions of the wire rod securely.

In the latter mechanical installing means whereby the end portion (one end or both ends) of the wire rod is locked, a socket member, a flathead machine screw and a threaded hole for using the flathead machine screw the necessary, and thus although locking can be secured to an advantage a high cost is unavoidable.

SUMMARY OF THE INVENTION

An object of the invention is to provide a locking structure for a wire rod for a filter element, whereby an end portion of the wire rod is ready for locking simply and at a moderate cost.

The invention is concerned with a locking structure of a wire rod for a filter element, which comprises forming a locking hole larger than a cross sectional area of the wire rod near both ends or at least one end portion of the cylinder having a passage leading in and out provided therein, inserting an end portion of the wire rod in the locking hole, fixing mechanically the end portion of the wire rod by forcing a wedge into the locking hole.

It is further intended that the wire rod is particularly formed triangularly in cross section, and a threaded groove angled the same as the rod is formed on an outer peripheral surface of the cylinder. This surface on which the wire rod is wound is made even peripherally. The cylinder has passages therein beneath the rod thereby functioning effectively as a filtration and separation device.

The end portion of the wire rod is inserted in the locking hole somewhat larger than the rod and the wedge is driven therein through hammering, thereby fixing the end portion of the wire rod simply.

BRIEF DESCRIPTION OF THE DRAWINGS

FIG. 1 is a front view, partly cut away, representing one preferred embodiment of the invention; FIG. 2 is an enlarged fragmentary perspective sectional view of a main part thereof; FIG. 3 is a fragmentary enlarged perspective sectional view showing a locking structure, wherein (I) is an exploded view of the cylinder and a wedge, and (II) shows the rod and wedge in position on the cylinder.

DETAILED DESCRIPTION OF THE PREFERRED EMBODIMENT

One preferred embodiment of the invention will now be described with reference to the accompanying drawings.

A reference numeral 1 denotes a cylinder with a passage 2 leading in and out provided theroen, 3 indicates a wire rod to be wound on an outer peripheral surface of the cylinder 1, and the illustration refers to the case where the wire rod 3 is formed triangularly in section.

A reference numeral 4 denotes a threaded groove provided on the outer peripheral surface of the cylinder 1 with both end portions 1a, 1b left thereon and so formed to have the same angle as a top of the wire rod 3, and an outer surface of the wire rod 3 wound thereon forms a desired slit 5 to hold the same plane.

The passage 2 is constituted of a plurality of elongated grooves 2a leading axially of a portion of the cylinder where the threaded groove 4 is provided and flow holes 2b perforated in the bottom of the elongated grooves 2a, which is ready for communicating with an inner cavity 1A of the cylinder 1.

A reference numeral 6 denotes a locking hole formed at a termenus 4a of the threaded groove 4 and in contact with one end portion 1a or 1b or both end portions 1a, 1b, of the cylinder 1. Lacking hole 6 is perforated larger in size than the wire rod 3 so as to accept the end portion of the wire rod 3 therein. Then, it is simplest that the locking hole 6 be formed perpendicularly to the outer peripheral surface and radially toward the shaft center of the cylinder. However the locking stage may be ensured more securely by perforating the hole 6 slantingly to the surface instead of perpendicularly thereto so as to bend the wire rod 3 acutely to the direction in which the wire rod 3 is wound. A reference numeral 7 denotes a wedge for locking the wire rod 3 inserted in the locking hole 6. The wedge is sized to be force fitted into locking hole 6 and frictionally wedge the rod tightly in locked position The construction is such as mentioned above, and hence the end portion of the wire rod 3 is inserted in the locking hole 6 at the time of start and/or end of winding the wire rod 3. The desired wedge 7 is then pushed therein and hammered. The wedge 7 is gradually pushed into the locking hole 6 every time it is hammered, driven thoroughly at last, and thus the end portion of the wire rod 3 is securely locked.

The locking can be ensured more securely from working a side of the locking hole 6 on which the wire rod 3 is locked to a shape similar to that of the top of the wire rod 3.

According to the invention, an end portion of the wire rod to be wound on an outer peripheral surface of the cylinder can securely and simply be locked by the locking hole perforated in the cylinder and the wedge.

Accordingly, it can be utilized extensively as a simple type filter for separator and filter of liquid and powder. A preferred wire rod circular, angular or any other shape in section can be selected for use, and further the cost can be decreased to cope extensively with requirements.

What is claimed is:

1. A locking structure for a wire rod for an element consisting of a cylinder with a desired passage leading in and out provided thereon, and having a wire rod wound on an outer peripheral surface of the cylinder and having a desired sectional form, which comprises means forming a locking hole extending into said cylinder and transversely of said rod, said locking hole having a width in one direction greater than the width of said rod, and a wedge adapted to be force fitted into said hole and against a rod portion received in said hole a portion of said rod being fitted into said locking hole and said wedge being forced therein and against said rod portion to ther3eby wedge said rod into said locking hole whereby the wire rod is forcibly held within the locking hole solely by the wedge and the locking hole.

2. The locking structure for a wire rod for filter element as defined in claim 1, wherein the wire rod is formed triangularly in section, and the cylinder with the wire rod wound thereon comprises a threaded groove angled the same as a top of said wire rod with said rod being locked in said groove.

* * * * *